United States Patent [19]

Puttonen et al.

[11] Patent Number: 5,340,166
[45] Date of Patent: Aug. 23, 1994

[54] CONDUIT COLLAR AND METHOD OF INSTALLING THE COLLAR

[75] Inventors: Martti Puttonen, Huutjärvi; Vesa Juusti, Metsäkulma; Pekka Juusti, Karhula, all of Finland

[73] Assignee: RP Oy Teollisuuden ja Rakentaijain Palvelukeskus, Sunila, Finland

[21] Appl. No.: 910,106

[22] PCT Filed: Jan. 11, 1991

[86] PCT No.: PCT/FI91/00012
§ 371 Date: Jul. 10, 1992
§ 102(e) Date: Jul. 10, 1992

[87] PCT Pub. No.: WO91/10857
PCT Pub. Date: Jul. 25, 1991

[30] Foreign Application Priority Data

Jan. 12, 1990 [FI] Finland .................................. 900171
Nov. 30, 1990 [FI] Finland .................................. 905927

[51] Int. Cl.⁵ .......................... F16L 5/00; F16L 13/14
[52] U.S. Cl. ........................ 285/189; 285/213; 285/201; 285/382; 285/222; 52/220.8; 29/525
[58] Field of Search ............ 285/189, 162, 213, 214, 285/215, 216, 201, 202, 382, 382.7, 222; 52/232, 220.8, 504, 321; 29/525

[56] References Cited

U.S. PATENT DOCUMENTS

| | | | |
|---|---|---|---|
| 1,211,349 | 1/1917 | Prahl | 285/162 |
| 1,288,163 | 12/1918 | Peterson | 285/216 |
| 2,078,903 | 4/1937 | Domack | 285/216 |
| 2,870,242 | 1/1959 | Wilkerson | 52/220.8 |
| 3,123,939 | 3/1964 | Erickson | 52/220.8 |
| 3,148,896 | 9/1964 | Jasper et al. | |
| 4,194,750 | 3/1980 | Sovish et al. | |
| 4,268,041 | 5/1981 | Sovish et al. | |
| 4,364,210 | 12/1982 | Fleming et al. | 52/220.8 |
| 4,627,647 | 12/1986 | Hauff | 285/162 |
| 4,630,415 | 12/1986 | Attwell | 52/321 |
| 5,105,592 | 4/1992 | MacMillan et al. | 52/232 |

FOREIGN PATENT DOCUMENTS

| | | |
|---|---|---|
| 91096 | 6/1961 | Denmark . |
| 0318019 | 11/1988 | European Pat. Off. . |
| 1209823 | 1/1966 | Fed. Rep. of Germany . |
| 2748894 | 5/1978 | Fed. Rep. of Germany . |
| 3734785 | 3/1989 | Fed. Rep. of Germany . |

*Primary Examiner*—Eric K. Nicholson
*Attorney, Agent, or Firm*—Mason, Fenwick & Lawrence

[57] ABSTRACT

The invention relates to a conduit collar and method for installing the conduit collar in a circular hole through concrete and stone structures used in industrial construction work. The conduit collar includes at least one circumferential rib with an outer perimeter having a diameter larger than the diameter of the hole before the collar is installed into the hole. The outer perimeter of at least one of the circumferential ribs conforms to fit inside the hole when the collar is installed into the hole.

12 Claims, 5 Drawing Sheets

5,340,166

CONDUIT COLLAR AND METHOD OF INSTALLING THE COLLAR

BACKGROUND OF THE INVENTION

The object of this invention is a conduit collar and a method for installing a conduit collar into a hole made into a concrete or stone structure.

In industrial construction work it is at times necessary to insert pipes, hoses, conductors, etc., through structures. The normal procedure is to use a diamond drill to bore a hole in the desired spot for passing through the pipes, etc. As the items to be passed through must not come into contact with the surrounding structure, it is necessary to provide the hole with a protective collar to prevent the entry of water and falling material. As the conduit collar it may be used a pipe with a flange welded thereto for its fastening and sealing. Often it is also necessary to have the concrete structure around the hole pick dressed to accommodate the flange prior to the final mounting of the collar. Using wedge anchors, the collar pipe is then fastened by its flange to the concrete structure. This is followed by concrete being cast over the flange to provide well sealed fastening. The resulting surface may require finishing.

Another way of installing a conduit in a concrete structure is to weld starter bars onto the conduit collar sheath. The collar is then inserted in the hole. The gap between the collar pipe and the hole periphery is then boarded up from below and concrete is poured into the gap to fuse the collar with the concrete structure. The formwork boards are dismantled once the concrete has set.

Yet another way to execute a conduit is to use two pipes, one inside the other and both tapering in the same direction. Here too, the external pipe has to be provided with a flange for the pipe to stay in the hole. Sealing compound is also often needed between the pipe sheaths. Another precaution is to bolt the flange of the other pipe to the floor.

The disadvantages of the above methods include time consuming installation, the labour input of several persons, and several work stages (pick dressing, casting of concrete, welding and formwork). The fastening of the boarding underneath the hole is difficult because high elevations or cramped spaces necessitate different scaffolding for the assembling and dismantling of the formwork. The latter method necessitates the use of two pipes.

SUMMARY OF THE INVENTION

The conduit collar and the method for installing it in accordance with the invention are decisive improvements on the above shortcomings.

The foremost advantage of the invention maybe considered to be in that the collar and method in accordance with the invention facilitate speedy installation as well as a well sealed and ready-to-use structure. Most advantageously, the collar comprises two ribs inserted into the hole wherein they result in a stable structure within the hole and the resultant sealing effect is superior to that achievable if only one rib is employed. Additionally, it is advantageous that the rib near the mouth of the hole seals the mouth and thereby prevents water from flowing into the gap between the hole and the collar sheath. If the collar comprises three or more ribs inserted into the hole, the resultant friction between the hole and the rib may become quite considerable. Due to the above reasons, the most advantageous form of implementation of the invention will comprise two insertable ribs.

In the following, the invention is described in detail by referring to the appended drawings.

DESCRIPTION OF THE PREFERRED EMBODIMENTS

Figure 1A:
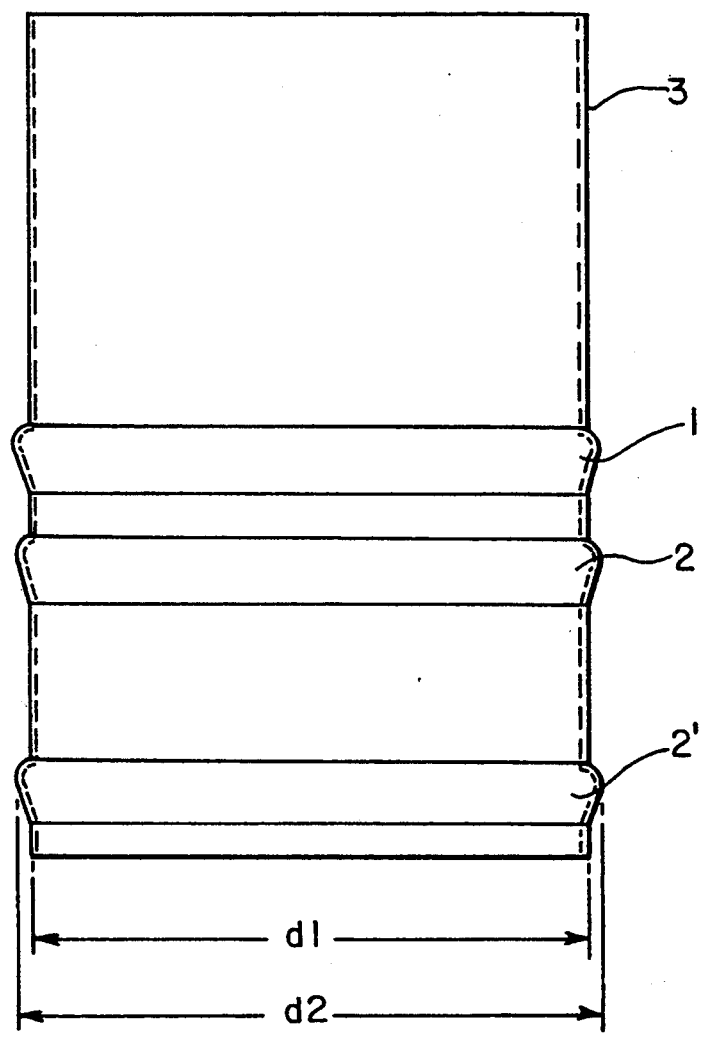
FIGS. 1a and 1b depict the conduit collar in accordance with the invention.
Figure 1B:
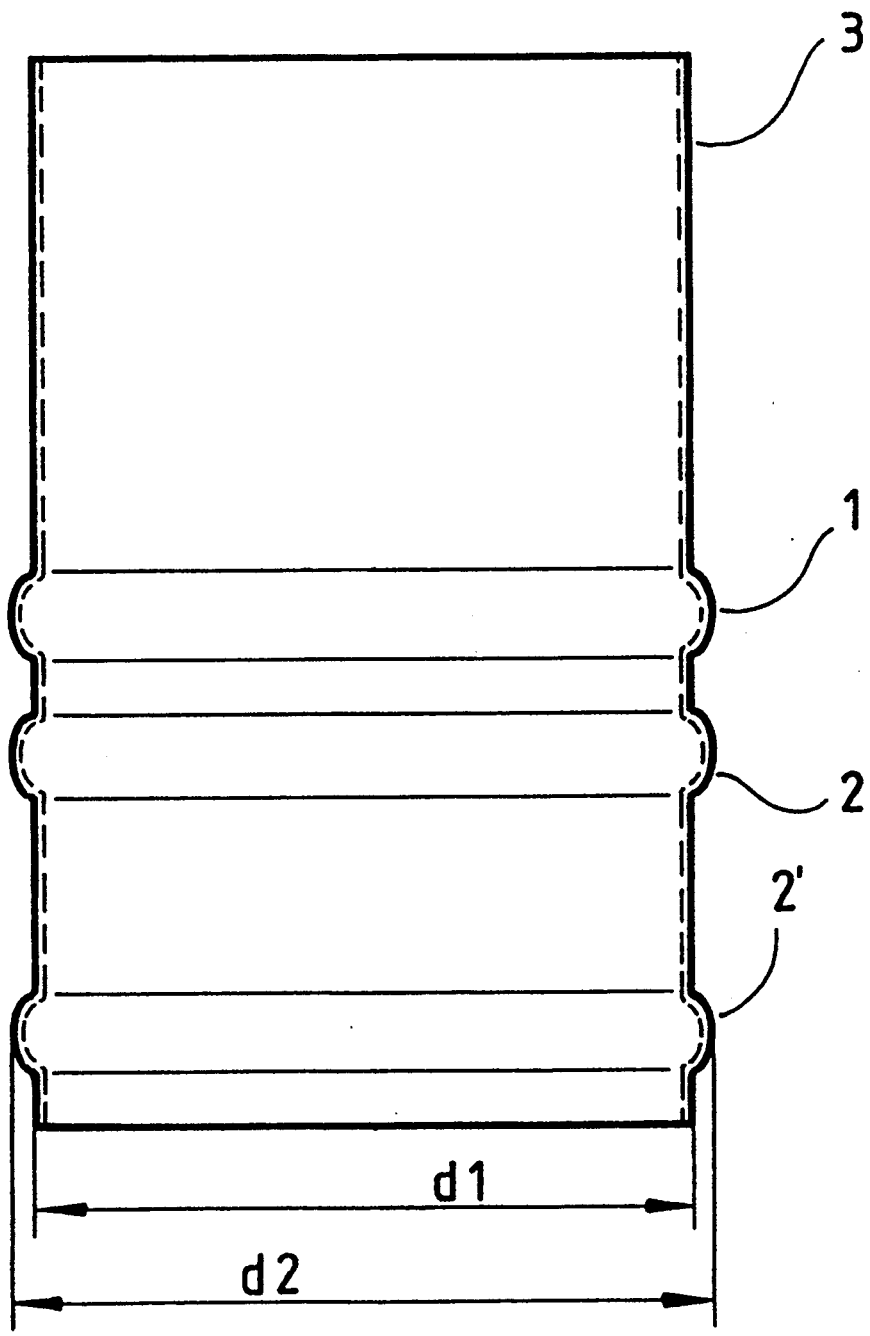

The conduit collar depicted in FIG. 1 comprises ribs 1, 2, and 2' and a tube 3 with an outside diameter of $d_1$. Ribs 1, 2, and 2' are advantageously essentially wedge-like or semi-circular in cross section.

Figure 2:
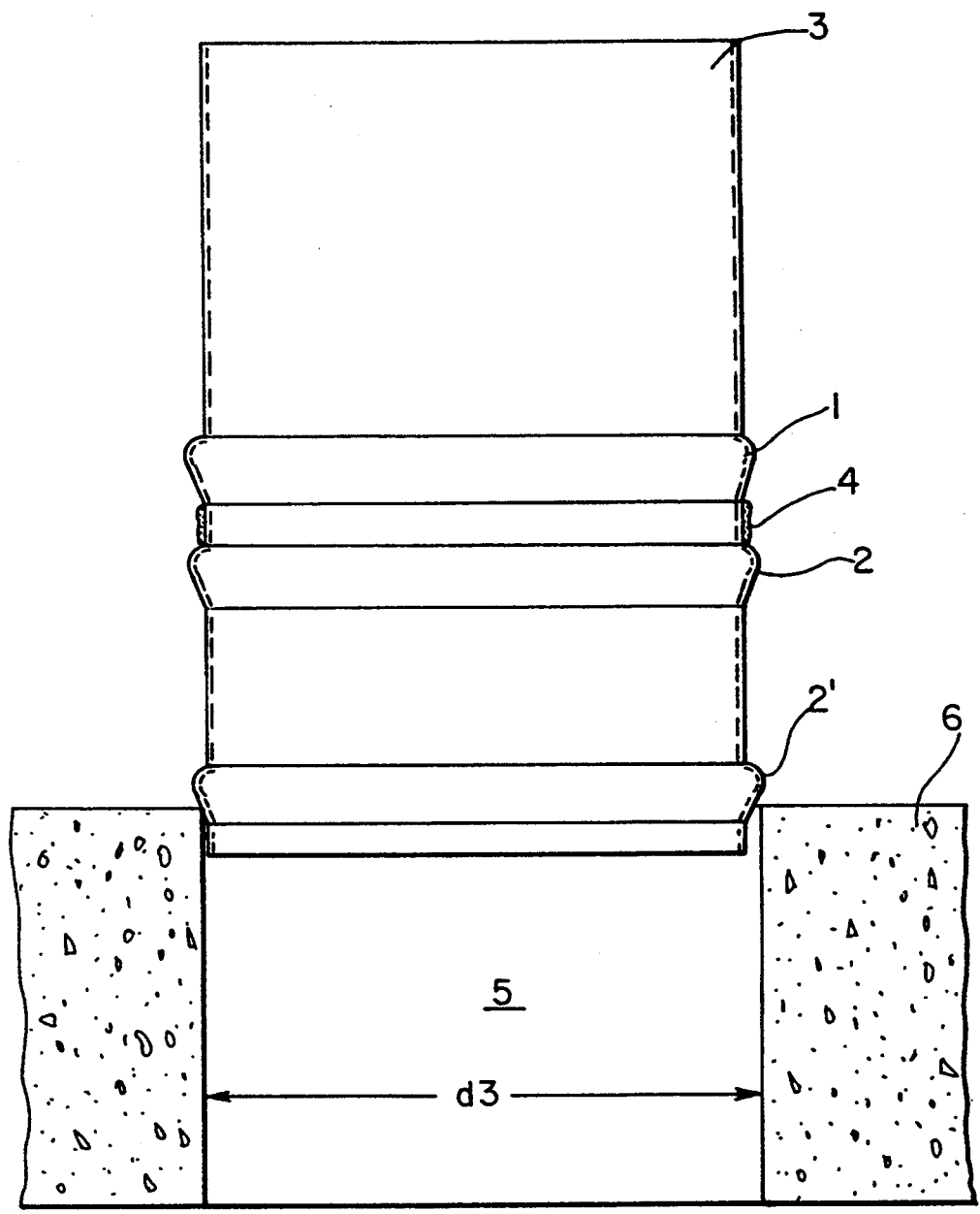
FIG. 2 depicts the insertion into a hole made into a concrete structure of a conduit collar in accordance with the invention.

In FIG. 2, sealing compound 4 has been spread in between rib 1 and rib 2. FIG. 2 depicts the insertion of conduit tube 3 into a hole 5 with a diameter of $d_3$ bored into the concrete or stone structure 6.

Figure 3:
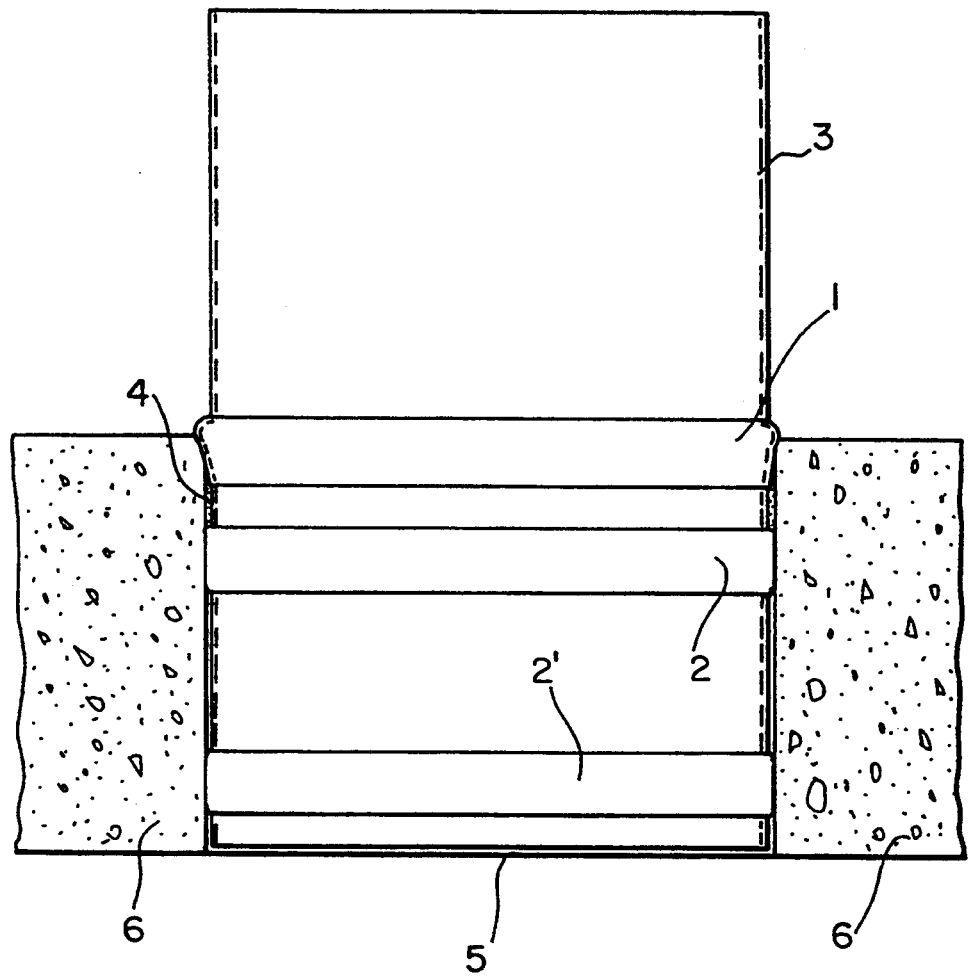
FIG. 3 depicts the fastening into a hole of a conduit collar in accordance with the invention.
Figure 4:
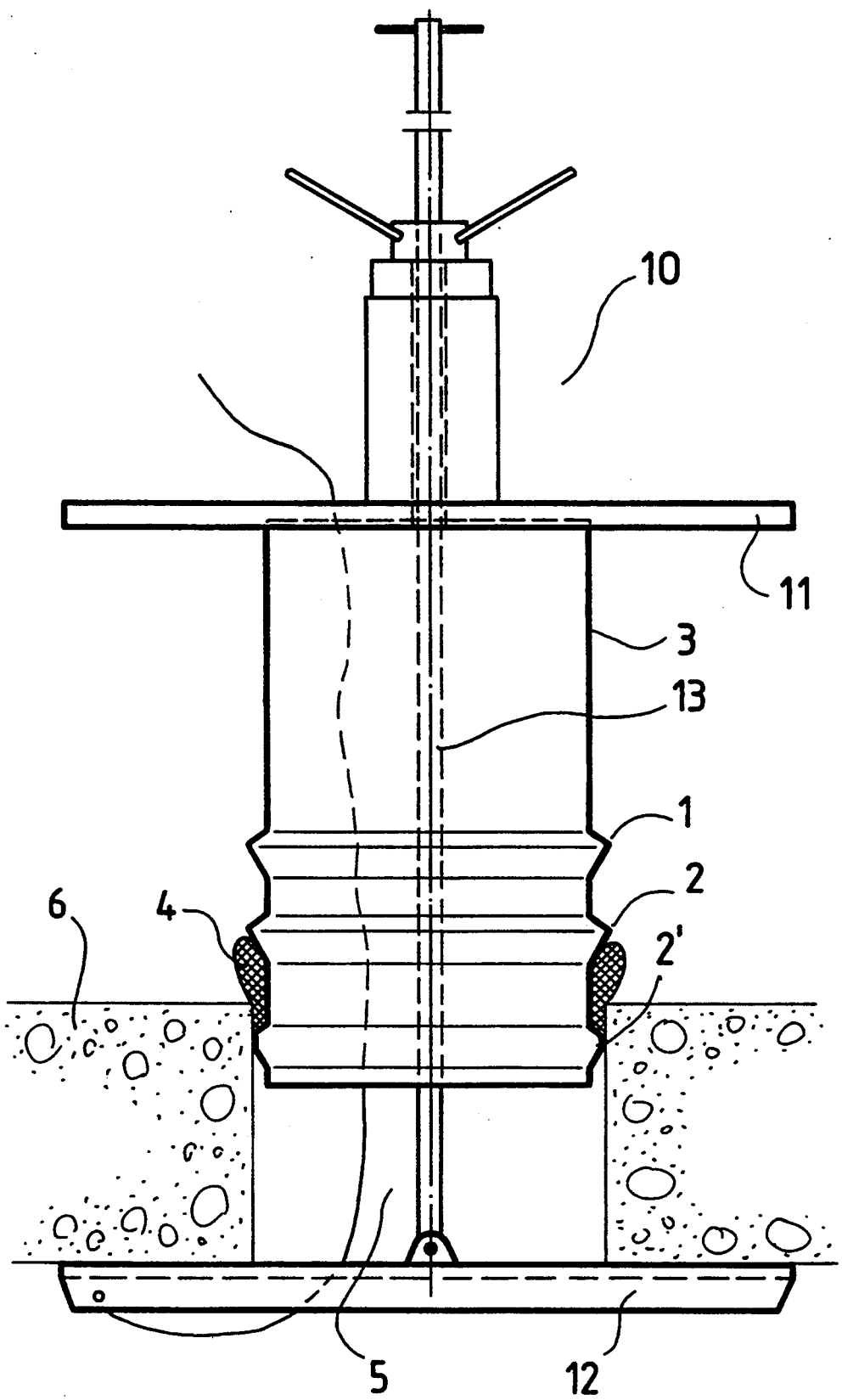
FIG. 4 depicts the draw-in device being used to insert the conduit collar into the hole.

FIG. 3 depicts the installation of collar 3 into hole 5. The result is a well sealed structure that prevents splash water from flowing into the gap between the outer sheath and the hole.

Prior to inserting ribs 2 and 2' into the hole, sealing compound 4 may be spread onto the area between said ribs. Since the conduit collar ribs that are inserted into the hole 5 are slightly larger than the diameter of hole 5, the conduit collar has to be forced into hole 5, Once the conduit collar is in the hole, rib 1 will become tightly wedged to the mouth of the conduit hole.

As an example, the plate thickness of a collar in accordance with the invention made of acid-proof stainless steel material might be 1.5 mm. The diameter of a rib to be inserted advantageously inside the hole would in such a case be, at its largest diameter, 2 mm larger than the diameter of the hole while the outside diameter of the collar conduit would be approximately 2 mm smaller than the diameter of the hole. The outside diameter of the rib positioned advantageously at the mouth of the hole is greater than the diameter of the rib inserted into the hole. In addition, it is necessary to point out that the combined arc widths of the ribs inserted advantageously into the hole are less than half of the length of the hole.

Various known devices for and means of inserting the collar can be used. For example, one may use a draw-in device 10 comprising a grooved installation plate 11 the grooves of which are such that they fit onto the end of the tube 3. At the other end there is the tool's counter piece 12. The counter piece and the tightening nut on top of the installation plate are Joined by a tie bolt 13. Upon the nut being tightened, the counter piece becomes supported by the base of the concrete structure and the installation plate is drawn steadily downward. The nut is tightened until the upper rib is level with the mouth of the hole.

It should be noted that in the above the invention has been described with reference being made to only one of its implementation examples. In no way is this intended to confine the invention to apply to only this example. On the contrary, many variations, such as the number and shape of the ribs, the material used to make the conduit collar, are possible within the framework of the inventive idea as defined in the following patent claims.

We claim:

1. A method to be employed when installing a collar having a central axis into a circular hole made through a concrete or stone structure, wherein pipes and tubes may be passed through the collar, and wherein the collar has a central axis and two ends and is made from steel plate approximately 1.5 mm thick, the collar has an external diameter approximately 2 mm smaller than the diameter of the circular hole, the collar has a plurality of axially spaced circumferential ribs, wherein said ribs each have an outer perimeter lying on a plane perpendicular to the central axis of the collar and wherein said outer perimeter has a first diameter approximately 2 mm larger than the diameter of the hole before the collar is mounted in the hole;

the method comprising the steps of:

placing one end of the collar adjacent to the hole with the collar axially lined up with the hole;

forcing the collar into the hole with a draw-in device wherein said outer perimeter of said ribs conforms to assume the diameter of the hole when the collar is mounted in the hole.

2. The method of claim 1, further including the step of:

spreading a sealing compound on the external diameter of the collar in between said axially spaced circumferential ribs before the step of forcing the collar into the hole.

3. A conduit collar adapted to be mounted in a circular hole through a concrete or stone structure; said collar having a central axis and being made from steel plate approximately 1.5 mm thick; said collar having an external diameter approximately 2 mm smaller than the diameter of the hole; said collar having a first circumferential rib, wherein said first circumferential rib has an outer perimeter lying on a plane perpendicular to the central axis of the collar and wherein said outer perimeter has a first diameter approximately 2 mm larger than the diameter of the hole before the collar is mounted in the hole and said outer perimeter conforms to assume the diameter of the hole when the collar is mounted in the hole.

4. The conduit collar of claim 3, additionally including a second circumferential rib spaced axially along said collar from said first circumferential rib.

5. The conduit collar of claim 3, further including a second circumferential rib axially spaced from said first circumferential rib, said second circumferential rib having an outer perimeter with a second diameter larger than said first diameter and located adjacent to an end of said hole when the collar is mounted in the hole.

6. The conduit collar of claim 4, further including a third circumferential rib axially spaced from said first and second circumferential ribs, said third circumferential rib having an outer perimeter with a second diameter larger than said first diameter and located adjacent an end of said hole when the collar is mounted in the hole.

7. The conduit collar of claim 3, wherein said first circumferential rib is essentially wedge-like in cross-section.

8. The conduit collar of claim 3, wherein said first circumferential rib is essentially semi-circular in cross-section.

9. The conduit collar of claim 3, wherein the collar extends into the hole a first distance in the direction of the central axis, and said first circumferential rib has a total combined width in the direction of the central axis, and said total combined width is less than half of said first distance.

10. The conduit collar of claim 3, wherein said collar is formed of stainless steel.

11. The conduit collar of claim 10, additionally including a second circumferential rib spaced axially along said collar from said first circumferential rib.

12. The conduit collar of claim 10, further including a second circumferential rib axially spaced from said first circumferential rib, said second circumferential rib having an outer perimeter with a second diameter larger than said first diameter and located adjacent an end of said hole when the collar is mounted in the hole.

* * * * *